Figure 1:
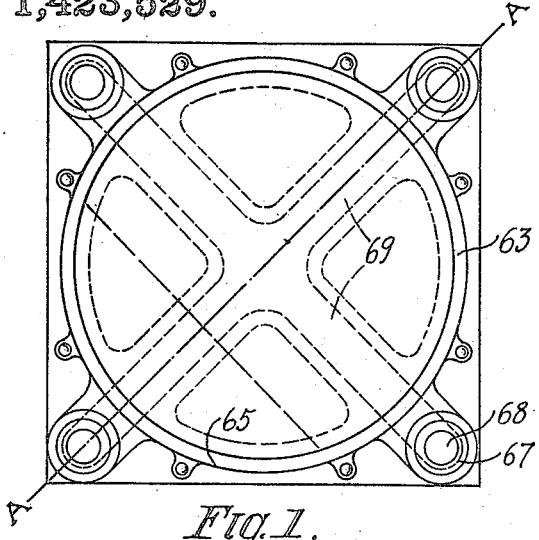

G. W. AND C. B. KING, B. JACOBY, H. E. ROUSH, AND G. HOLMES.
S. KING, EXECUTRIX, OF G. W. KING, DEC'D.
LEVEL INDICATOR FOR PLATFORMS.
APPLICATION FILED AUG. 24, 1918.

1,423,529.

Patented July 25, 1922.

Inventors.
George W. King Dec'd
by Sarah King Exr.
CHARLES B. KING
GRANT HOLMES
BENJAMIN JACOBY
HERBERT E. ROUSH.
BY
ATTORNEY.

UNITED STATES PATENT OFFICE.

GEORGE W. KING, DECEASED, LATE OF MARION, OHIO, BY SARAH KING, EXECUTRIX, OF MARION, OHIO, AND CHARLES B. KING, BENJAMIN JACOBY, AND HERBERT E. ROUSH, OF MARION, OHIO, AND GRANT HOLMES, OF DANVILLE, ILLINOIS, ASSIGNORS TO THE MARION STEAM SHOVEL CO., OF MARION, OHIO.

LEVEL INDICATOR FOR PLATFORMS.

1,423,529.     Specification of Letters Patent.    Patented July 25, 1922.

Original application filed June 2, 1917, Serial No. 172,355. Divided and this application filed August 24, 1918. Serial No. 251,341.

*To all whom it may concern:*

Be it known that CHARLES B. KING, BENJAMIN JACOBY, and HERBERT E. ROUSH, citizens of the United States, residing at Marion, in the county of Marion and State of Ohio, GRANT HOLMES, a citizen of the United States, residing at Danville, in the county of Vermilion and State of Illinois, and GEORGE W. KING, deceased, late a citizen of the United States, residing at Marion aforesaid, of whose estate SARAH KING is executrix, have invented certain new and useful Improvements in Level Indicators for Platforms, of which the following is a specification, reference being had therein to the accompanying drawings.

This invention relates to leveling devices for platforms, and is a division of the application filed by George W. King, Charles B. King, Benjamin Jacoby, Herbert Roush and Grant Holmes on June 2, 1917, Serial No. 172355.

The invention is designed more particularly for use with excavating machines, but obviously it can be used with platforms of various kinds. In the operation of machines of the kind mentioned it is important that the platform be maintained in a certain position. Sometimes this position is horizontal, and at other times it is desirable that one portion, or corner, of the platform shall be lower than the other portions thereof. The ground surface over which the machine is moved is usually very uneven and more or less frequent adjustments are necessary in order to maintain the platform in the desired position. From the operator's position on the platform it is difficult to determine the exact position of the platform with relation to the horizontal and this renders the adjustment of the platform difficult.

The object of the invention is to provide a device which can be located near the operator's station on the platform to indicate the position of the platform with relation to the horizontal; and, further, to provide such a device which will indicate the character and amount of adjustment which is necessary in order to place the platform in a desired position.

A further object of the invention is to provide a device of this kind which will be very simple in its construction and positive in its operation. Other objects of the invention will appear as the mechanism is described in detail.

Figure 2:
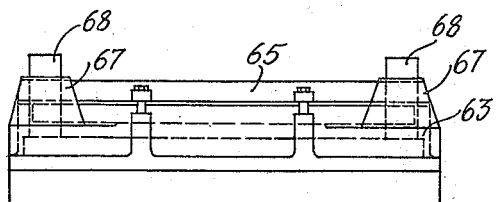
Figure 3:
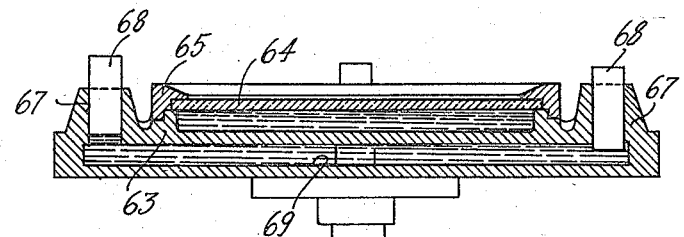

In the accompanying drawings Fig. 1 is a plan view of a device embodying our invention; Fig. 2 is a side elevation of the same; and Fig. 3 is a sectional view taken centrally through the device of Fig. 1.

In these drawings we have shown one embodiment of our invention and have illustrated the same as designed primarily for application to a large revolving steam shovel such as is shown in the above mentioned application. In such a machine it is desirable that some means should be provided which will co-operate with and be controlled by the position of the platform to indicate to the operator the position of the platform and which portion thereof must be adjusted, and what adjustment must be made thereof to restore the platform to the desired position. We have, therefore, provided an indicating device which is mounted on the platform adjacent to the engineer's station, and which comprises a shallow receptacle 63 adapted to contain a fluid, and having a flat upper wall provided with a sight opening having a closure of transparent material, preferably of glass, as shown at 64, this glass being held in position by a clamping collar 65 having a circular opening through which the liquid in the receptacle may be viewed. This receptacle is mounted on a standard 66 in a position parallel with the platform. The fluid does not quite fill the receptacle and upon any tilting of the movable platform the fluid will flow away from one side of the receptacle and will form a chord-like line extending across the sight opening of the receptacle parallel with the axis about which the platform is tilted, and indicating the amount of inclination of the supporting platform and the exact direction of the inclination. That is, it will show which corner is low and which is high, and whether one corner is low, or whether two corners are low. In order that the operator may more readily determine just which corner must be adjusted and the character of that adjustment, we have provided, in connection with the indicating device above described, a supplemental device, which, however, may, if desired be used independently of the indicating device, and which comprises a rectangular frame having at each corner a socket 67 in which is slidably mounted a plug 68 which fits snugly within the socket, but is free to rise and fall therein. The several sockets are connected one to the other by diagonal passages 69 which are filled with fluid. The edges of the frame are arranged parallel with the edges of the rotating frame, and when this frame is in its normal position its lateral edges are parallel with the adjacent edges of the supporting platform and the edges of the indicator frame will be parallel with the edges of the supporting platform. When this platform is level each plunger will project from its socket the same distance. If the platform tilts toward one corner the fluid flowing toward that corner will cause the adjacent plunger to project a greater distance from its socket and the diagonally opposite plunger will follow the fluid into the socket and will thus project a lesser distance beyond the end thereof. The distances which the respective plungers project indicate the amount of adjustment necessary to be made with the respective trucks to restore the platform to its normal position, it being apparent that the greater the depression of the corner of the truck the greater the elevation of the plunger. The main indicating device and the supplemental device are preferably combined in a single structure and as here shown the sockets are formed in the corners of the frame constituting the receptacle 63 and the passageways 69 are formed beneath the receptacle.

The operation of the device will be readily understood from the foregoing description of the several parts thereof and it will be apparent that we have provided an indicating device which will indicate to the operator, at his station on the platform, the exact position of the platform with relation to the horizontal; and which will further indicate to the operator which portions of the platform must be adjusted, and the amount of adjustment necessary, to place the platform as a whole in the desired position.

While we have shown and described one embodiment of our invention we wish to be understood that we do not desire to be limited to the details of construction shown and described as various modifications will occur to a person skilled in the art.

Having now fully described our invention, what we claim as new and desire to secure by Letters Patent is:

1. A device to indicate the position of a tiltable platform comprising a shallow container for a fluid having a flat transparent top arranged parallel with the platform to cause the fluid in said container to form a chord-like line parallel with the axis about which said platform is tilted, and also having intersecting conduits containing a fluid and provided at their ends with vertical sockets and plungers mounted in said sockets and having parts adapted to project above the tops of the respective sockets.

2. A device to indicate the position of a tiltable platform, comprising a body portion having intersecting conduits communicating one with the other at the point of intersection and arranged substantially parallel with the plane of said platform, and having at their outer ends vertical sockets in open communication therewith, and plungers mounted in said sockets and controlled by said fluid to indicate the extent of the tilting movement imparted to said platform.

3. An indicator of the character described, comprising a structure having fluid container in the upper portion thereof, the upper wall of said container having sight opening, said structure also having conduits arranged beneath said fluid container, communicating one with the other and adapted to contain a fluid, and plungers slidably mounted in said structure and so arranged that their movement will be controlled by the movement of the fluid in said conduits.

CHARLES B. KING.
BENJAMIN JACOBY.
HERBERT E. ROUSH.
SARAH KING,
*Executrix of the estate of Geo. W. King, deceased.*
GRANT HOLMES.